United States Patent
Watanabe et al.

(10) Patent No.: US 11,879,864 B2
(45) Date of Patent: Jan. 23, 2024

(54) METAL TERMINAL

(71) Applicant: NGK INSULATORS, LTD., Aichi (JP)

(72) Inventors: Yusuke Watanabe, Nagoya (JP); Shotaro Niizuma, Kasugai (JP); Hayami Aota, Nagoya (JP); Toshihiro Hirakawa, Kasugai (JP)

(73) Assignee: NGK INSULATORS, LTD., Nagoya (JP)

(*) Notice: Subject to any disclaimer, the term of this patent is extended or adjusted under 35 U.S.C. 154(b) by 315 days.

(21) Appl. No.: 17/113,432

(22) Filed: Dec. 7, 2020

(65) Prior Publication Data

US 2021/0172902 A1 Jun. 10, 2021

(30) Foreign Application Priority Data

Dec. 10, 2019 (JP) .................. 2019-222645

(51) Int. Cl.
*G01N 27/406* (2006.01)
*H01R 11/11* (2006.01)
*H01R 13/20* (2006.01)
*H01R 4/08* (2006.01)
*G01N 27/409* (2006.01)

(52) U.S. Cl.
CPC ....... *G01N 27/4062* (2013.01); *G01N 27/409* (2013.01); *H01R 4/08* (2013.01); *H01R 11/11* (2013.01); *H01R 13/20* (2013.01)

(58) Field of Classification Search
CPC .... G01N 27/4062; G01N 27/409; H01R 4/18; H01R 11/11; H01R 13/20
See application file for complete search history.

(56) References Cited

U.S. PATENT DOCUMENTS

| 2007/0052862 | A1* | 3/2007 | Matsuo | ............... G01N 27/407 348/669 |
| 2007/0096615 | A1* | 5/2007 | Matsuo | ............. G01N 27/4062 313/143 |
| 2010/0139379 | A1* | 6/2010 | Kume | ................ G01N 27/4062 73/114.73 |
| 2014/0298931 | A1* | 10/2014 | Oba | ....................... H01R 11/01 73/866.5 |

(Continued)

FOREIGN PATENT DOCUMENTS

| JP | 2018-132407 A | 8/2018 |
| JP | 2019-012010 A | 1/2019 |
| JP | 2019-035646 A | 3/2019 |

*Primary Examiner* — Joshua L Allen
*Assistant Examiner* — Vivian A Tran
(74) *Attorney, Agent, or Firm* — MATTINGLY & MALUR, PC (57) ABSTRACT

A metal terminal includes an element contacting portion which is disposed at one end of the metal terminal and is placed in contact with a sensor element, a lead wire retaining member which is disposed at another end of the metal terminal, and crimps and retains lead wires, a positioning member disposed between the one end and the other end and extending in a direction intersecting one direction, the positioning member positioning the metal terminal on a ceramic housing, and a guide member provided integrally with the positioning member at a site between the positioning member and the lead wire retaining member.

10 Claims, 6 Drawing Sheets (56) References Cited

U.S. PATENT DOCUMENTS

2014/0299469 A1* 10/2014 Oba .................... G01N 27/407
                                                                 204/412
2016/0209351 A1* 7/2016 Oba .................. G01N 27/4062
2019/0004007 A1   1/2019 Oba et al.

\* cited by examiner

[TABLE 1]

| | EXISTENCE OF GUIDE | GUIDE SHAPE | GUIDE AREA [mm²] | GUIDE HEIGHT h1 [mm] | GUIDE HEIGHT h2 [mm] | GUIDE LENGTH L [mm] | JUDGMENT |
|---|---|---|---|---|---|---|---|
| EXEMPLARY EMBODIMENT 1 | YES | SQUARE | 0.01 | 0.10 | 0.10 | 0.10 | B |
| EXEMPLARY EMBODIMENT 2 | YES | TRIANGULAR | 0.01 | 0.20 | 0.00 | 0.10 | B |
| EXEMPLARY EMBODIMENT 3 | YES | TRAPEZOIDAL | 0.01 | 0.07 | 0.03 | 0.10 | B |
| EXEMPLARY EMBODIMENT 4 | YES | RECTANGULAR | 7.50 | 3.00 | 3.00 | 2.50 | A |
| EXEMPLARY EMBODIMENT 5 | YES | TRAPEZOIDAL | 7.50 | 4.00 | 2.00 | 2.50 | A |
| EXEMPLARY EMBODIMENT 6 | YES | RECTANGULAR | 1.50 | 1.00 | 1.00 | 1.50 | A |
| EXEMPLARY EMBODIMENT 7 | YES | RECTANGULAR | 0.80 | 0.80 | 0.80 | 1.00 | A |
| EXEMPLARY EMBODIMENT 8 | YES | TRIANGULAR | 0.80 | 1.60 | 0.00 | 1.00 | A |
| EXEMPLARY EMBODIMENT 9 | YES | TRAPEZOIDAL | 0.80 | 1.00 | 0.60 | 1.00 | A |
| EXEMPLARY EMBODIMENT 10 | YES | RECTANGULAR | 0.38 | 0.46 | 0.46 | 0.82 | A |
| EXEMPLARY EMBODIMENT 11 | YES | TRIANGULAR | 0.41 | 1.00 | 0.00 | 0.82 | A |
| EXEMPLARY EMBODIMENT 12 | YES | TRAPEZOIDAL | 0.37 | 0.60 | 0.30 | 0.82 | A |
| EXEMPLARY EMBODIMENT 13 | YES | RECTANGULAR | 0.18 | 0.30 | 0.30 | 0.61 | A |

FIG. 6

[TABLE 2]

| | EXISTENCE OF GUIDE | GUIDE SHAPE | GUIDE AREA [mm$^2$] | GUIDE HEIGHT h1 [mm] | GUIDE HEIGHT h2 [mm] | GUIDE LENGTH L [mm] | JUDGMENT |
|---|---|---|---|---|---|---|---|
| EXEMPLARY EMBODIMENT 14 | YES | TRIANGULAR | 0.18 | 0.60 | 0.00 | 0.61 | A |
| EXEMPLARY EMBODIMENT 15 | YES | TRAPEZOIDAL | 0.18 | 0.40 | 0.20 | 0.61 | A |
| EXEMPLARY EMBODIMENT 16 | YES | RECTANGULAR | 0.11 | 0.22 | 0.22 | 0.49 | A |
| EXEMPLARY EMBODIMENT 17 | YES | TRIANGULAR | 0.10 | 0.40 | 0.00 | 0.49 | A |
| EXEMPLARY EMBODIMENT 18 | YES | TRAPEZOIDAL | 0.10 | 0.30 | 0.10 | 0.49 | A |
| EXEMPLARY EMBODIMENT 19 | YES | RECTANGULAR | 0.05 | 0.15 | 0.15 | 0.30 | A |
| EXEMPLARY EMBODIMENT 20 | YES | TRIANGULAR | 0.05 | 0.30 | 0.00 | 0.30 | A |
| EXEMPLARY EMBODIMENT 21 | YES | TRAPEZOIDAL | 0.05 | 0.20 | 0.10 | 0.30 | A |
| EXEMPLARY EMBODIMENT 22 | YES | RECTANGULAR | 0.08 | 0.13 | 0.13 | 0.60 | A |
| EXEMPLARY EMBODIMENT 23 | YES | TRIANGULAR | 0.08 | 0.25 | 0.00 | 0.60 | A |
| EXEMPLARY EMBODIMENT 24 | YES | TRAPEZOIDAL | 0.09 | 0.20 | 0.10 | 0.60 | A |
| COMPARATIVE EXAMPLE 1 | NO | - | - | - | - | - | C |

METAL TERMINAL

CROSS-REFERENCE TO RELATED APPLICATION

This application is based upon and claims the benefit of priority from Japanese Patent Application No. 2019-222645 filed on Dec. 10, 2019, the contents of which are incorporated herein by reference.

BACKGROUND OF THE INVENTION

Field of the Invention

The present invention relates to a metal terminal, for example, a metal terminal that is suitable for use in a gas sensor.

Description of the Related Art

The invention described in Japanese Laid-Open Patent Publication No. 2018-132407 has the object of providing a gas sensor, which improves productivity by inserting, into a separator, a terminal fitting to which a lead wire has been connected beforehand, together with preventing detachment or pulling off of the terminal fitting toward a rear end side.

In order to achieve such an object, the terminal fitting of Japanese Laid-Open Patent Publication No. 2018-132407 includes a main body portion (21a), a locking portion (21f) that bends in a radial direction D along a surface S perpendicular to an axial direction O, and a collar portion (21d) having a first distal end facing surface (301). The separator further includes a shelf portion (166a) communicating with an insertion hole (166h) and having a first rear end facing surface (302), and a second distal end facing surface (303) communicating with the insertion hole. The locking portion protrudes toward an outer side in the radial direction more so than the insertion hole on the distal end side of the second distal end facing surface. A second rear end facing surface (304) of the locking portion abuts against the second distal end facing surface. The first distal end facing surface of the collar portion abuts against the first rear end facing surface of the shelf portion, and thereby prevents detachment of the terminal fitting toward the distal end or rear end.

The invention described in Japanese Laid-Open Patent Publication No. 2019-012010 provides a method for manufacturing a gas sensor in which damage or deformation of oppositely disposed terminal fittings is suppressed when the terminal fittings are attached to a separator.

In the above-described manufacturing method, a first jig (300) is used in which a planar surface portion (312) having a predetermined thickness and arranged at a position corresponding to facing surfaces of contact portions is erected from a bottom surface (300b) of an accommodation space (300h). The above-described manufacturing method includes a separator accommodating step, a terminal fitting retaining step, and a jig detachment step. In the separator accommodating step, the separator is accommodated in the first jig, and the planar surface portion is inserted into an insertion hole of the separator at a position corresponding to the facing surfaces. In the terminal fitting retaining step, the terminal fittings are inserted respectively into the insertion hole from a rear end side of the separator, in a manner so that the planar surface portion is interposed between the contact portions. In the jig detachment step, the first jig is detached from the separator.

The invention described in Japanese Laid-Open Patent Publication No. 2019-035646 has the object of improving an insulating property in the interior of a sensor. In order to achieve such an object, a metal terminal for use in a sensor is equipped with a terminal contact portion, a signal line connecting portion, and a closure portion. The closure portion is arranged between the terminal contact portion and the signal line connecting portion, and partially closes a through hole of a separator in a manner so that a core wire can be retained in the interior thereof.

SUMMARY OF THE INVENTION

Generally, in an automobile exhaust gas sensor, a metal terminal such as those described in the aforementioned prior art documents is used in order to provide an electrical contact between a gas concentration detection element and a lead wire.

The metal terminal includes a retaining member (for example, the crimp terminal part 211c of Japanese Laid-Open Patent Publication No. 2019-012010) that crimps and retains an inserted lead wire, and a positioning member (for example, the detachment preventing member 211d of Japanese Laid-Open Patent Publication No. 2019-012010) that locks the metal terminal inside a ceramic separator and fixes the position thereof.

However, due to vibrations and the like of an automobile, repetitive loads such as tension, compression, bending, and shearing or the like may be applied between the positioning member and the lead wire retaining member of the metal terminal, and there is a risk of damage occurring to the metal terminal.

An object of the present invention is to provide a metal terminal that can prevent damage from occurring to the metal terminal, even when the aforementioned various repetitive loads are applied between the positioning member and the lead wire retaining member of the metal terminal, or when put to use under a usage environment in which vibrations are intense, and that is capable of increasing the commercial value of a gas sensor.

A metal terminal according to one aspect of the present invention is a metal terminal, which is installed in a gas sensor including a sensor element and a ceramic housing configured to retain a rear end portion of the sensor element, the metal terminal being configured to electrically connect the sensor element and a lead wire, and comprising an element contacting portion disposed at one end of the metal terminal, and configured to be placed in contact with the sensor element, a lead wire retaining member disposed at another end of the metal terminal, and configured to crimp and retain the lead wire, a positioning member disposed between the one end and the another end, and extending in a direction intersecting one direction, the positioning member being configured to position the metal terminal on the ceramic housing, and a guide member provided integrally with the positioning member at a site between the positioning member and the lead wire retaining member.

According to the present invention, it is possible to prevent damage from occurring to the metal terminal, even when the aforementioned various repetitive loads are applied between the positioning member and the lead wire retaining member of the metal terminal, or when put to use under a usage environment in which vibrations are intense, and increase the commercial value of the gas sensor.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a metal terminal according to the present invention will be presented and described in detail below with reference to the accompanying drawings.

Initially, a description will be given with reference to FIGS. 1 and 2 concerning a gas sensor 10 to which a metal terminal 18 according to the embodiment is applied.

Figure 1:
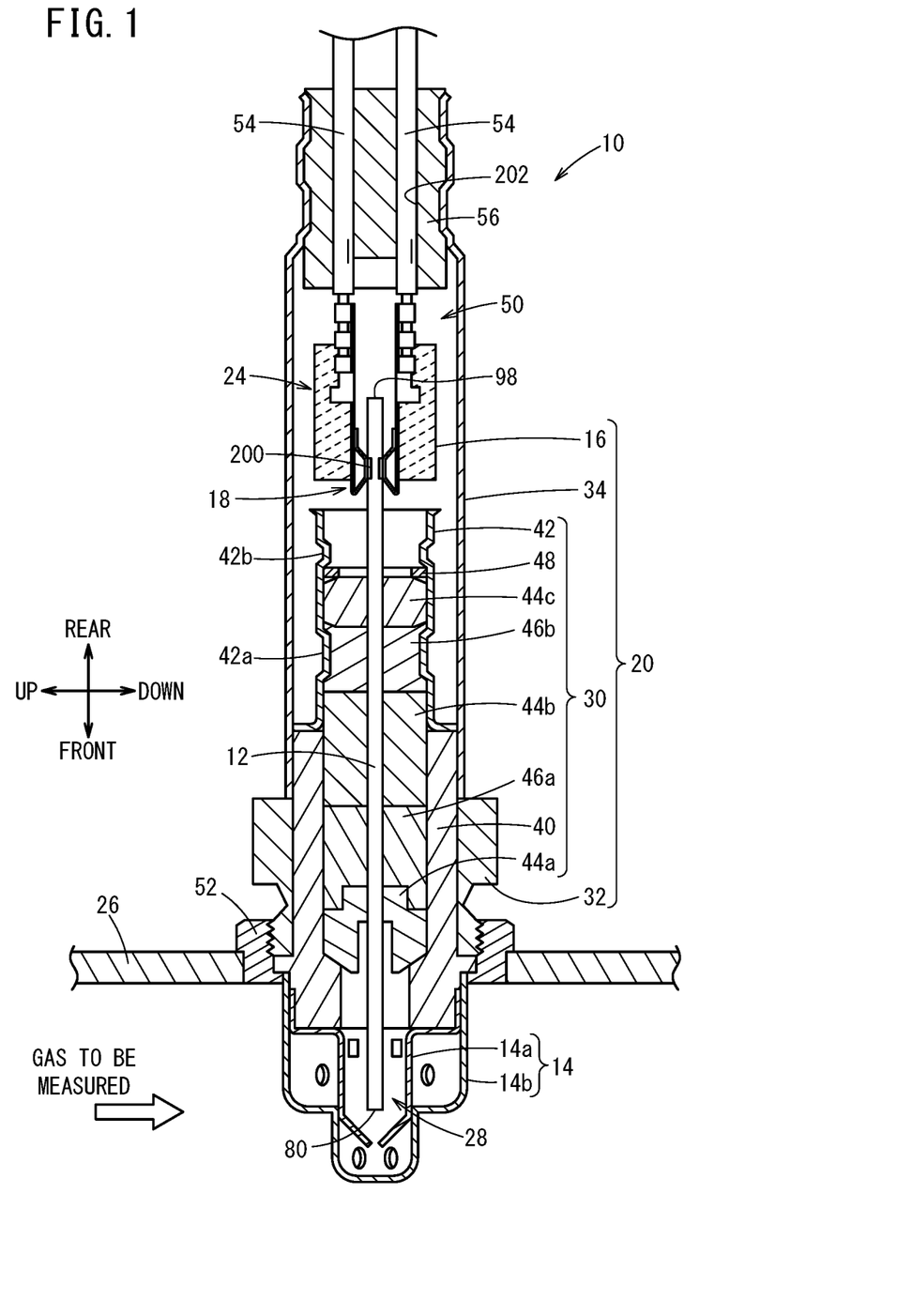
FIG. 1 is a cross-sectional view showing an example of a gas sensor to which there is attached a metal terminal according to the present embodiment.

As shown in FIG. 1, the gas sensor 10 includes a sensor element 12. The sensor element 12 is of an elongated cuboid shape, the longitudinal direction of the sensor element 12 (the horizontal direction as shown in FIG. 2) is defined as a front-rear direction, and the thickness direction of the sensor element 12 (the vertical direction as shown in FIG. 2) is defined as an up-down direction. Further, the widthwise direction of the sensor element 12 (the direction perpendicular to the front-rear direction and the up-down direction) is defined as a left-right direction.

The gas sensor 10 includes the sensor element 12, a protective cover 14 for protecting a front end side of the sensor element 12, and a sensor assembly 20 including a ceramic housing 16. The ceramic housing 16 retains a rear end portion of the sensor element 12, and a metal terminal 18 electrically connected to the sensor element 12 is installed in the ceramic housing 16. The ceramic housing 16 thus functions as a connector 24.

As shown in the figure, the gas sensor 10 is attached to a pipe 26 such as the exhaust gas pipe of a vehicle, and is used in order to measure the concentration of a specified gas such as NOx or $O_2$ contained in the exhaust gas which serves as a gas to be measured.

The protective cover 14 includes a bottomed tubular inner side protective cover 14a that covers the front end of the sensor element 12, and a bottomed tubular outer side protective cover 14b that covers the inner side protective cover 14a. The inner side protective cover 14a and the outer side protective cover 14b are formed with a plurality of holes therein for allowing the gas to be measured to flow into the interior of the protective cover 14. A sensor element chamber 28 is formed as a space surrounded by the inner side protective cover 14a, and the front end of the sensor element 12 is arranged inside the sensor element chamber 28.

The sensor assembly 20 has an element sealing body 30 for sealing and fixing the sensor element 12, a nut 32 attached to the element sealing body 30, and an outer cylinder 34. The sensor assembly 20 is equipped with the connector 24 which is in contact with as well as being electrically connected to non-illustrated electrodes formed on surfaces (upper and lower surfaces) of the rear end of the sensor element 12.

The element sealing body 30 includes a tubular main metal fitting 40, and a tubular inner cylinder 42 coaxially welded and fixed to the main metal fitting 40. The element sealing body 30 is equipped with ceramic supporters 44a to 44c, compressed powder bodies 46a and 46b, and a metal ring 48 enclosed in a through hole on the inner side of the main metal fitting 40 and the inner cylinder 42. The sensor element 12 is positioned on the central axis of the element sealing body 30, and penetrates through the element sealing body 30 in the front-rear direction. A reduced diameter portion 42a for pressing the compressed powder body 46b in a direction toward the central axis of the inner cylinder 42 is formed on the inner cylinder 42. Further, a reduced diameter portion 42b for pressing the ceramic supporters 44a to 44c and the compressed powder bodies 46a and 46b in a frontward direction via the metal ring 48 is formed on the inner cylinder 42. Due to the pressing force from the reduced diameter portions 42a and 42b, the compressed powder bodies 46a and 46b are compressed between the main metal fitting 40 and the inner cylinder 42 and the sensor element 12. Consequently, the compressed powder bodies 46a and 46b provide sealing between the sensor element chamber 28 inside the protective cover 14 and a space 50 inside the outer cylinder 34, and fix the sensor element 12 in place.

The nut 32 is fixed coaxially with the main metal fitting 40, and a male threaded portion is formed on the outer circumferential surface thereof. The male threaded portion of the nut 32 is inserted into a fixing member 52 which is welded to the pipe 26 and is provided with a female threaded portion on the inner circumferential surface thereof. Consequently, the gas sensor 10 is fixed to the pipe 26, in a state with the front end of the sensor element 12, and a portion of the protective cover 14 of the gas sensor 10 protruding into the pipe 26.

The outer cylinder 34 covers the periphery of the inner cylinder 42, the sensor element 12, and the connector 24, and a plurality of lead wires 54, which are connected to the connector 24, are drawn out from the rear end. The lead wires 54 are electrically connected to respective electrodes (to be described later) of the sensor element 12 via the connector 24. A gap between the outer cylinder 34 and the lead wires 54 is sealed by an elastic insulating member 56 constituted by a grommet or the like. The space 50 inside the outer cylinder 34 is filled with a reference gas (an atmospheric gas according to the present embodiment). The rear end of the sensor element 12 is arranged in the space 50.

Figure 2:
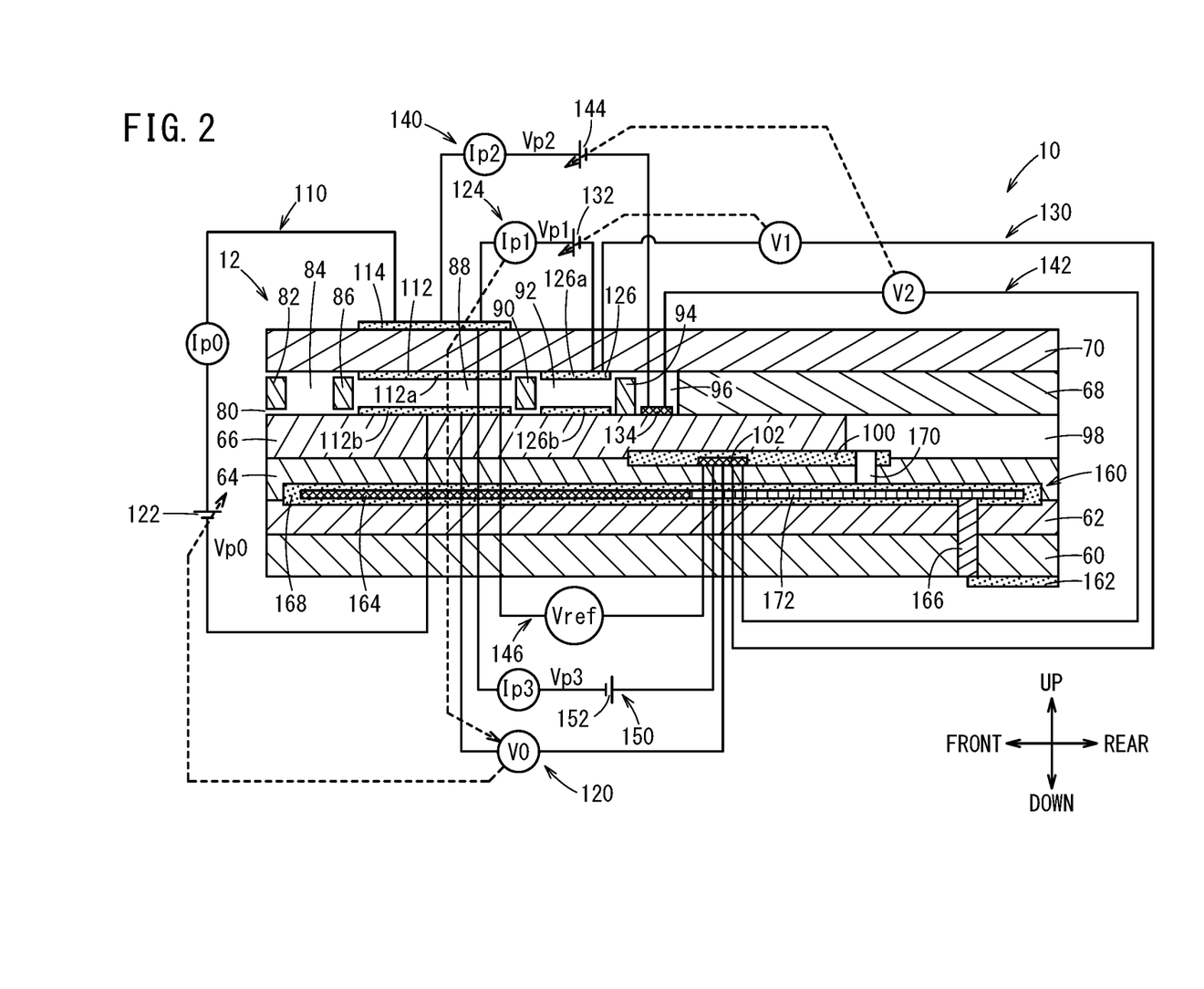
FIG. 2 is a schematic cross-sectional view schematically showing an example of the configuration of a sensor element.

On the other hand, as shown in FIG. 2, the sensor element 12 is an element having a stacked body in which six layers, each of which is formed of an oxygen ion conductive solid electrolyte layer such as zirconia ($ZrO_2$), are stacked on each other. The six layers include a first substrate layer 60, a second substrate layer 62, a third substrate layer 64, a first solid electrolyte layer 66, a spacer layer 68, and a second solid electrolyte layer 70, which are stacked in this order from the lower side in the drawing. The solid electrolyte that forms these six layers is dense and possesses airtightness. For example, after having performed a predetermined process and printing of circuit patterns on ceramic green sheets corresponding to the respective layers, the sensor element 12 is manufactured by stacking, and furthermore, firing and integrating the respective layers.

A gas introduction port 80, a first diffusion control member 82, a buffer space 84, a second diffusion control member 86, a first internal vacancy 88, a third diffusion control member 90, a second internal vacancy 92, a fourth diffusion control member 94, and a third internal vacancy 96 are formed adjacent to each other in this order, at one end of the sensor element 12 (the left side in FIG. 2) between a lower surface of the second solid electrolyte layer 70 and an upper surface of the first solid electrolyte layer 66.

The gas introduction port 80, the buffer space 84, the first internal vacancy 88, the second internal vacancy 92, and the third internal vacancy 96 are spaces in the interior of the sensor element 12. Such spaces are provided by way of hollowing out the spacer layer 68, and the upper portions thereof are defined by lower surface of the second solid electrolyte layer 70, the lower portions thereof are defined by upper surface of the first solid electrolyte layer 66, and the side portions thereof are defined by side surfaces of the spacer layer 68.

The first diffusion control member 82, the second diffusion control member 86, and the third diffusion control member 90 are each provided as two horizontally elongated slits (in which the openings thereof have a longitudinal direction in a direction perpendicular to the drawing). Further, the fourth diffusion control member 94 is provided as a single horizontally elongated slit (in which the opening thereof has a longitudinal direction in a direction perpendicular to the drawing) formed as a gap with the lower surface of the second solid electrolyte layer 70. The portion from the gas introduction port 80 to the third internal vacancy 96 is also referred to as a gas-to-be-measured flow through section.

Further, at a position more distant from one end side than the gas-to-be-measured flow through section, and between an upper surface of the third substrate layer 64 and a lower surface of the spacer layer 68, a reference gas introduction space 98 is provided such that the side portions thereof are defined by the side surfaces of the first solid electrolyte layer 66. For example, the atmospheric gas (the atmosphere inside the space 50 shown in FIG. 1) is introduced into the reference gas introduction space 98 as a reference gas when measurement of the NOx concentration is performed.

An atmospheric gas introduction layer 100 is a layer made of a ceramic such as porous alumina, and exposed to the reference gas introduction space 98. The reference gas is introduced into the atmospheric gas introduction layer 100 through the reference gas introduction space 98. Further, the atmospheric gas introduction layer 100 is formed in a manner so as to cover a reference electrode 102. The atmospheric gas introduction layer 100 introduces the reference gas inside the reference gas introduction space 98 to the reference electrode 102, while imparting a predetermined diffusion resistance to the reference gas. Further, the atmospheric gas introduction layer 100 is formed in a manner so as to be exposed to the reference gas introduction space 98 only at a position further to the rear end side (the right side shown in FIG. 2) of the sensor element 12 than the reference electrode 102. Stated otherwise, the reference gas introduction space 98 is not formed up to a location directly above the reference electrode 102. However, the reference electrode 102 may also be formed directly below the reference gas introduction space 98 shown in FIG. 2.

The reference electrode 102 is formed so as to be sandwiched between the upper surface of the third substrate layer 64 and the first solid electrolyte layer 66, and as described above, the atmospheric gas introduction layer 100 which is connected to the reference gas introduction space 98 is disposed around the periphery of the reference electrode 102. Moreover, the reference electrode 102 is formed directly on the upper surface of the third substrate layer 64, and a portion thereof other than the portion in contact with the upper surface of the third substrate layer 64 is covered by the atmospheric gas introduction layer 100. Further, as will be discussed later, it is possible to measure the oxygen concentration (oxygen partial pressure) inside the first internal vacancy 88, inside the second internal vacancy 92, and inside the third internal vacancy 96, by using the reference electrode 102. The reference electrode 102 is formed as a porous cermet electrode (for example, a cermet electrode of Pt and $ZrO_2$).

In the gas-to-be-measured flow through section, the gas introduction port 80 is a site that opens to the external space, and the gas to be measured is drawn into the sensor element 12 from the external space through the gas introduction port 80. The first diffusion control member 82 is a site that imparts a predetermined diffusion resistance to the gas to be measured which is drawn in from the gas introduction port 80. The buffer space 84 is a space provided in order to guide the gas to be measured that is introduced from the first diffusion control member 82 to the second diffusion control member 86. The second diffusion control member 86 is a site that imparts a predetermined diffusion resistance to the gas to be measured which is drawn into the first internal vacancy 88 from the buffer space 84. The operation, in which the gas to be measured is introduced from the exterior of the sensor element 12 to the interior of the first internal vacancy 88, is carried out in the following manner. More specifically, the gas to be measured, which is suddenly drawn into the sensor element 12 from the gas introduction port 80 due to a pressure fluctuation of the gas to be measured in the external space, is not directly introduced into the first internal vacancy 88. After a fluctuation in the concentration of the gas to be measured is canceled through the first diffusion control member 82, the buffer space 84, and the second diffusion control member 86, the gas is introduced into the first internal vacancy 88. Consequently, the fluctuation in the concentration of the gas to be measured that is introduced into the first internal vacancy 88 becomes almost negligible. The aforementioned fluctuation in pressure of the gas to be measured in the external space is a pulsation of the exhaust pressure in the case that the gas to be measured is an exhaust gas of an automobile. The first internal vacancy 88 is provided as a space for adjusting the oxygen partial pressure within the gas to be measured that is introduced through the second diffusion control member 86. Such oxygen partial pressure is adjusted by operation of a main pump cell 110 described later.

The main pump cell 110 is an electrochemical pump cell, which is constituted by an interior side pump electrode 112, an exterior side pump electrode 114, and the second solid electrolyte layer 70 which is sandwiched between the two pump electrodes. The interior side pump electrode 112 is provided on an inner surface of the first internal vacancy 88.

The exterior side pump electrode 114 is provided in a region, corresponding to the interior side pump electrode 112, on an upper surface of the second solid electrolyte layer 70 so as to be exposed to the external space (the sensor element chamber 28 of FIG. 1).

The interior side pump electrode 112 spans over the upper and lower solid electrolyte layers (the second solid electrolyte layer 70 and the first solid electrolyte layer 66) that define the first internal vacancy 88, and the spacer layer 68 that serves as the side walls of the first internal vacancy 88. More specifically, a ceiling electrode portion 112a of the interior side pump electrode 112 is formed on the lower surface of the second solid electrolyte layer 70 that serves as a ceiling surface of the first internal vacancy 88. Further, a bottom electrode portion 112b is directly formed on the upper surface of the first solid electrolyte layer 66 that serves as a bottom surface of the first internal vacancy 88. In addition, side electrode portions (not shown) are formed so as to connect the ceiling electrode portion 112a and the bottom electrode portion 112b. More specifically, the side electrode portions are formed on side wall surfaces (inner surfaces) of the spacer layer 68 constituting both side wall portions of the first internal vacancy 88, and the interior side pump electrode 112 is formed to have a structure like a tunnel at a site where the side electrode portions are disposed.

The interior side pump electrode 112 and the exterior side pump electrode 114 are formed as porous cermet electrodes (for example, cermet electrodes of $ZrO_2$ and Pt containing 1% of Au). Moreover, the interior side pump electrode 112 in contact with the gas to be measured is formed using a material having a weakened reduction ability with respect to the NOx component within the gas to be measured.

The main pump cell 110 applies a desired pump voltage Vp0 between the interior side pump electrode 112 and the exterior side pump electrode 114, and thereby distributes a pump current Ip0 in a positive direction or a negative direction between the interior side pump electrode 112 and the exterior side pump electrode 114. Consequently, the oxygen inside the first internal vacancy 88 can be pumped out into the external space, or alternatively, the oxygen can be pumped in from the external space into the first internal vacancy 88.

Further, an oxygen partial pressure detecting sensor cell 120 for main pump control is constituted by the interior side pump electrode 112, the second solid electrolyte layer 70, the spacer layer 68, the first solid electrolyte layer 66, and the reference electrode 102. Such an electrochemical sensor cell detects the oxygen concentration (oxygen partial pressure) within the atmosphere in the first internal vacancy 88.

By measuring an electromagnetic force V0 in the oxygen partial pressure detecting sensor cell 120 for main pump control, it becomes possible to comprehend and determine the oxygen concentration (oxygen partial pressure) inside the first internal vacancy 88. Furthermore, the pump current Ip0 is controlled by feedback-controlling the pump voltage Vp0 of a variable power supply 122 in a manner so that the electromotive force V0 becomes constant. Consequently, the oxygen concentration inside the first internal vacancy 88 can be maintained at a predetermined constant value.

The third diffusion control member 90 is a site that imparts a predetermined diffusion resistance to the gas to be measured, the oxygen concentration (oxygen partial pressure) of which is controlled by operation of the main pump cell 110 in the first internal vacancy 88, and guides the gas to be measured into the second internal vacancy 92.

The second internal vacancy 92 is provided as a space for further carrying out adjustment of the oxygen partial pressure by an auxiliary pump cell 124, on the gas to be measured which is introduced through the third diffusion control member 90, after the oxygen concentration (oxygen partial pressure) thereof has been adjusted beforehand in the first internal vacancy 88. In accordance with this feature, the oxygen concentration inside the second internal vacancy 92 can be kept constant with high accuracy, and therefore, in the gas sensor 10, it becomes possible to measure the NOx concentration with high accuracy.

The above-described auxiliary pump cell 124 is an auxiliary electrochemical pump cell, which is constituted by an auxiliary pump electrode 126 provided on an inner surface of the second internal vacancy 92, the exterior side pump electrode 114, and the second solid electrolyte layer 70. The exterior side pump electrode 114 can be any other suitable electrode formed on the outer side of the sensor element 12.

The auxiliary pump electrode 126 is arranged inside the second internal vacancy 92, and has a tunnel-like structure similar to that of the interior side pump electrode 112 provided inside the first internal vacancy 88. Stated otherwise, a ceiling electrode portion 126a is formed with respect to the second solid electrolyte layer 70 that serves as a ceiling surface of the second internal vacancy 92. Further, a bottom electrode portion 126b is directly formed on the upper surface of the first solid electrolyte layer 66 that serves as a bottom surface of the second internal vacancy 92. In addition, side electrode portions (not shown) connecting the ceiling electrode portion 126a and the bottom electrode portion 126b are formed respectively on both wall surfaces of the spacer layer 68 that serve as the side walls of the second internal vacancy 92, whereby a tunnel-like structure is formed. Moreover, in the same manner as the interior side pump electrode 112, the auxiliary pump electrode 126 is also formed using a material having a weakened reduction ability with respect to the NOx component within the gas to be measured.

The auxiliary pump cell 124 applies a desired voltage Vp1 between the auxiliary pump electrode 126 and the exterior side pump electrode 114. Consequently, the oxygen within the atmosphere inside the second internal vacancy 92 can be pumped out into the external space, or alternatively, the oxygen can be pumped in from the external space into the second internal vacancy 92.

Further, an electrochemical sensor cell is constituted by the auxiliary pump electrode 126, the reference electrode 102, the second solid electrolyte layer 70, the spacer layer 68, and the first solid electrolyte layer 66. An oxygen partial pressure detecting sensor cell 130 for auxiliary pump control controls the oxygen partial pressure within the atmosphere inside the second internal vacancy 92.

Moreover, the auxiliary pump cell 124 carries out pumping by a variable power supply 132, the voltage of which is controlled based on an electromotive force V1 detected by the oxygen partial pressure detecting sensor cell 130 for auxiliary pump control. Consequently, the oxygen partial pressure within the atmosphere inside the second internal vacancy 92 is controlled so as to become a low partial pressure that does not substantially influence the measurement of NOx.

In addition, a pump current Ip1 thereof is used to control the electromotive force V0 of the oxygen partial pressure detecting sensor cell 120 for main pump control. More specifically, the pump current Ip1 is input as a control signal to the oxygen partial pressure detecting sensor cell 120 for main pump control, whereby the electromotive force V0 thereof is controlled. Consequently, the gradient of the oxygen partial pressure within the gas to be measured, which is introduced from the third diffusion control member 90 into the second internal vacancy 92, is controlled so as to always remain constant. When the gas sensor 10 is used as a NOx sensor, by the actions of the main pump cell 110 and the auxiliary pump cell 124, the oxygen concentration in the second internal vacancy 92 is maintained at a constant value on the order of 0.001 ppm.

The fourth diffusion control member 94 is a site that imparts a predetermined diffusion resistance to the gas to be measured, the oxygen concentration (oxygen partial pressure) of which is controlled by operation of the auxiliary pump cell 124 in the second internal vacancy 92, and guides the gas to be measured into the third internal vacancy 96. The fourth diffusion control member 94 fulfills a role of limiting the amount of NOx that flows into the third internal vacancy 96.

The third internal vacancy 96 is provided as a space for performing a process in relation to measurement of the nitrogen oxide (NOx) concentration within the gas to be measured, on the gas to be measured which is introduced through the fourth diffusion control member 94, after the oxygen concentration (oxygen partial pressure) thereof has been adjusted beforehand in the second internal vacancy 92. Measurement of the NOx concentration is primarily performed by operation of a measurement pump cell 140 in the third internal vacancy 96.

The measurement pump cell 140 measures the NOx concentration in the gas to be measured in the interior of the third internal vacancy 96. The measurement pump cell 140 is an electrochemical pump cell constituted by a measurement electrode 134, the exterior side pump electrode 114, the second solid electrolyte layer 70, the spacer layer 68, and the first solid electrolyte layer 66. The measurement electrode 134 is provided directly on the upper surface of the first solid electrolyte layer 66 facing the third internal vacancy 96. The measurement electrode 134, for example, is a porous cermet electrode. The measurement electrode 134 also functions as an NOx reduction catalyst for reducing NOx existing within the atmosphere inside the third internal vacancy 96.

In the measurement pump cell 140, it is possible to pump out oxygen that is generated by the decomposition of nitrogen oxide within the atmosphere around the periphery of the measurement electrode 134, and to detect the generated amount of oxygen as a pump current Ip2.

Further, in order to detect the oxygen partial pressure around the periphery of the measurement electrode 134, an electrochemical sensor cell, and more specifically, an oxygen partial pressure detecting sensor cell 142 for measurement pump control, is constituted by the first solid electrolyte layer 66, the measurement electrode 134, and the reference electrode 102. A variable power supply 144 is controlled based on an electromotive force V2 detected by the oxygen partial pressure detecting sensor cell 142 for measurement pump control.

The gas to be measured which is guided into the second internal vacancy 92 reaches the measurement electrode 134 of the third internal vacancy 96 through the fourth diffusion control member 94 under a condition in which the oxygen partial pressure is controlled. Nitrogen oxide existing within the gas to be measured around the periphery of the measurement electrode 134 is reduced ($2NO \rightarrow N_2+O_2$) to thereby generate oxygen. Then, the generated oxygen is subjected to pumping by the measurement pump cell 140. At this time, a voltage Vp2 of the variable power supply 144 is controlled in a manner so that the electromotive force V2 detected by the oxygen partial pressure detecting sensor cell 142 for measurement pump control becomes constant. The amount of oxygen generated around the periphery of the measurement electrode 134 is proportional to the nitrogen oxide concentration within the gas to be measured. Accordingly, the nitrogen oxide concentration within the gas to be measured can be calculated using the pump current Ip2 of the measurement pump cell 140.

Further, an electrochemical sensor cell 146 is constituted by the second solid electrolyte layer 70, the spacer layer 68, the first solid electrolyte layer 66, the third substrate layer 64, the exterior side pump electrode 114, and the reference electrode 102. In accordance with an electromotive force Vref obtained by the sensor cell 146, it is possible to detect the oxygen partial pressure within the gas to be measured existing externally of the sensor.

Furthermore, an electrochemical reference gas adjusting pump cell 150 is constituted by the second solid electrolyte layer 70, the spacer layer 68, the first solid electrolyte layer 66, the third substrate layer 64, the exterior side pump electrode 114, and the reference electrode 102. The reference gas adjusting pump cell 150 carries out pumping by distributing a control current Ip3 due to a voltage Vp3 applied by a variable power supply 152, which is connected between the exterior side pump electrode 114 and the reference electrode 102. Consequently, the reference gas adjusting pump cell 150 draws in oxygen from the space around the periphery of the exterior side pump electrode 114 (the sensor element chamber 28 in FIG. 1) into the space around the periphery of the reference electrode 102 (the atmospheric gas introduction layer 100). The voltage Vp3 of the variable power supply 152 is predetermined as a DC voltage, in a manner so that the control current Ip3 becomes a predetermined value (a DC current of a constant value).

In the gas sensor 10 having such a configuration, the main pump cell 110 and the auxiliary pump cell 124 are placed in operation. Consequently, the gas to be measured, in which the oxygen partial pressure is always maintained at a constant low value (a value that does not substantially exert an influence on the measurement of NOx), is imparted to the measurement pump cell 140. Accordingly, the aforementioned pump current Ip2 is distributed by pumping out the oxygen generated by the reduction of NOx from the measurement pump cell 140, substantially proportionally to the concentration of NOx within the gas to be measured. As a result, the NOx concentration in the gas to be measured can be known based on the pump current Ip2.

Furthermore, in order to increase the oxygen ion conductivity of the solid electrolyte, the sensor element 12 is equipped with a heater unit 160 which plays a role in adjusting the temperature for heating and maintaining the temperature of the sensor element 12. The heater unit 160 comprises a heater connector electrode 162, a heater 164, a through hole 166, a heater insulating layer 168, a pressure dissipation hole 170, and a lead wire 172.

The heater connector electrode 162 is formed so as to be in contact with a lower surface of the first substrate layer 60. By the heater connector electrode 162 being connected to an external power supply, power can be supplied from the exterior to the heater unit 160.

The heater 164 is an electric resistor formed in a state of being sandwiched from above and below between the second substrate layer 62 and the third substrate layer 64. The heater 164 is connected to the heater connector electrode 162 via the lead wire 172 and the through hole 166. The heater 164 generates heat by being supplied with electrical power from the exterior through the heater connector electrode 162, and heats and maintains the temperature of the solid electrolyte that forms the sensor element 12.

Further, the heater 164 is embedded over the entire area from the first internal vacancy 88 to the third internal vacancy 96, whereby the entire sensor element 12 can be adjusted to a temperature at which the solid electrolyte is activated.

The heater insulating layer 168 is an insulating layer formed on upper and lower surfaces of the heater 164 and made of porous alumina formed of an insulator of alumina or the like. The heater insulating layer 168 is formed with the aim of obtaining electrical insulation between the second substrate layer 62 and the heater 164, as well as electrical insulation between the third substrate layer 64 and the heater 164.

The pressure dissipation hole 170 is a site that is provided so as to penetrate through the third substrate layer 64 and communicate with the reference gas introduction space 98, and is formed with the aim of alleviating an increase in internal pressure accompanying a rise in the temperature inside the heater insulating layer 168.

It should be noted that the variable power supplies 122, 144, 132, and 152, etc., shown in FIG. 2 are actually connected to the respective electrodes via non-illustrated lead wires formed inside the sensor element 12, and the connector 24 and the lead wires 54 shown in FIG. 1.

In addition, as shown in FIG. 1, in the present embodiment, the metal terminal 18 that rearwardly extends is electrically connected to a terminal pad 200 that is exposed from the rear end portion of the sensor element 12. The ceramic housing 16 is installed around the periphery of the rear end portion of the sensor element 12, and the metal terminal 18 is fitted between the above-described terminal pad 200 and the ceramic housing 16. In accordance therewith, the terminal pad 200 of the sensor element 12 and the metal terminal 18 are crimped and electrically connected to each other. More specifically, the ceramic housing 16 is attached with the metal terminal 18 that is electrically connected to the sensor element 12, and retains the rear end portion of the sensor element 12.

A rear portion of the metal terminal 18 extends rearwardly of the ceramic housing 16, and is electrically connected to the lead wires 54 that are inserted inside the elastic insulating member 56. More specifically, in the elastic insulating member 56, a plurality of through holes 202 are formed in the axial direction of the sensor element 12. The lead wires 54 are inserted through the through holes 202, and the metal terminal 18 extending from the sensor element 12 and the lead wires 54 are electrically connected in a later-described manner.

Figure 3:
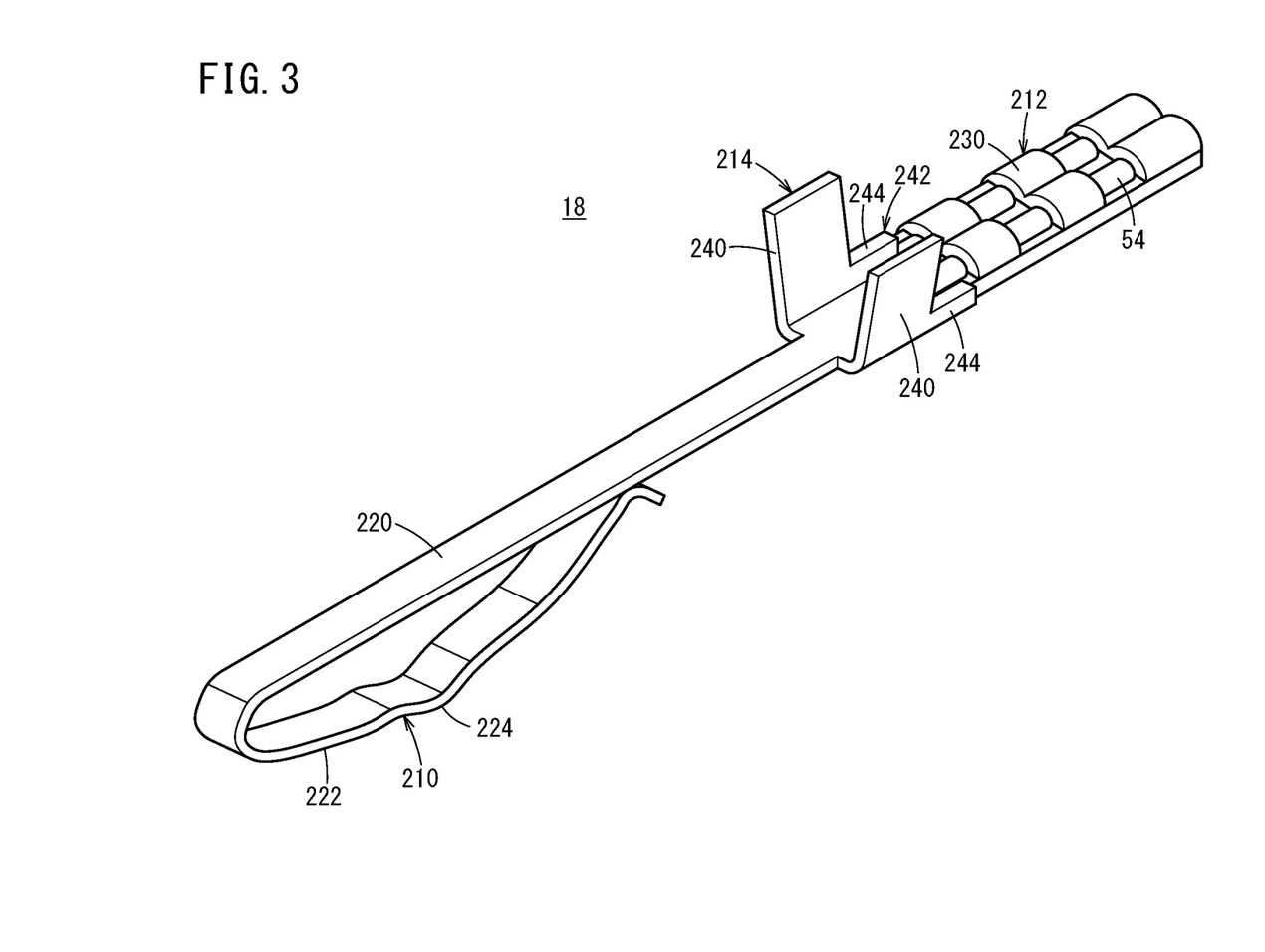
FIG. 3 is a perspective view showing the metal terminal according to the present embodiment.

As shown in FIG. 3, the metal terminal 18 according to the present embodiment includes an element contacting portion 210, a lead wire retaining member 212, and a positioning member 214.

The element contacting portion 210 is disposed at one end of the metal terminal 18, and is placed in contact with the sensor element 12. In the example shown in FIG. 3, a distal end portion 222 of an elongated extending portion 220 extending in one direction (the front-rear direction) has a rearwardly bent shape, and a top portion 224 thereof elastically contacts the terminal pad 200 of the sensor element 12 (see FIG. 1).

The lead wire retaining member 212 is disposed at the other end of the metal terminal 18, and crimps and retains the lead wires 54. More specifically, the lead wire retaining member 212 includes a plurality of tubular parts 230, and the metal terminal 18 and the lead wires 54 are electrically connected by inserting and crimping, inside the tubular parts 230, the lead wires 54 in which the conductive wires are exposed.

The positioning member 214 serves as a site for positioning the metal terminal 18 on the ceramic housing 16. The positioning member 214 is disposed between the one end and the other end of the metal terminal 18 in closest proximity to the lead wire retaining member 212, and includes a pair of plate-shaped portions 240 that are bent in a direction that intersects the one direction (the front-rear direction).

In particular, according to the present embodiment, a guide member 242, which is formed integrally with the positioning member 214, is provided at a site between the positioning member 214 and the lead wire retaining member 212 of the metal terminal 18. In the same manner as the positioning member 214, the guide member 242 also includes a pair of plate-shaped portions 244 that are bent in a direction intersecting the one direction (the front-rear direction).

Figure 4A:
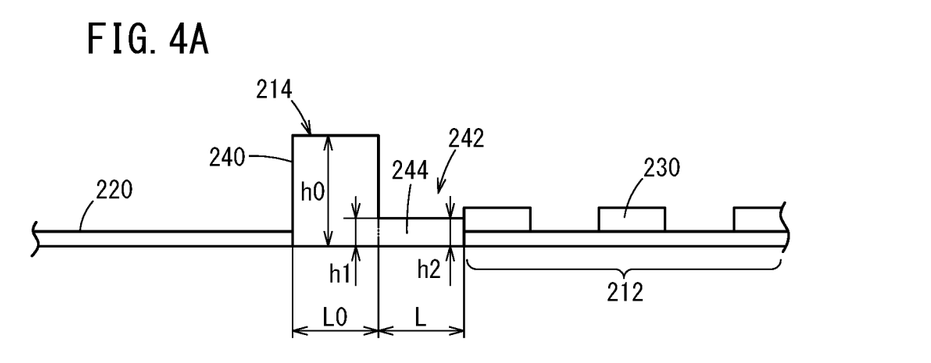
FIG. 4A is a side view showing an example in which a rectangular guide member is disposed between a positioning member and a lead wire retaining member of the metal terminal.
Figure 4B:
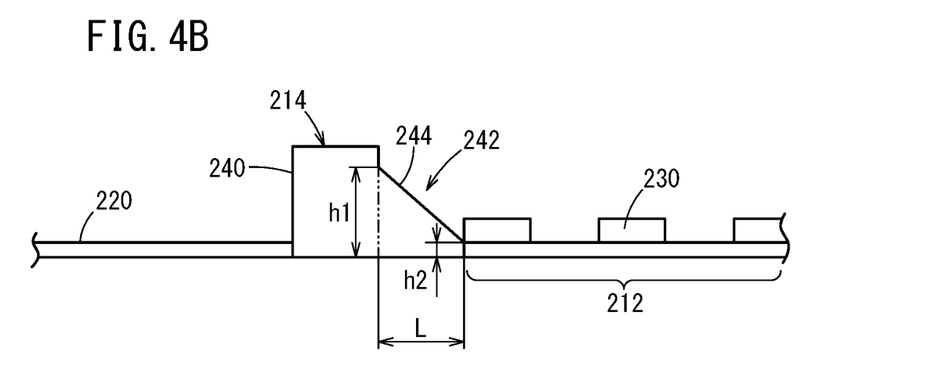
FIG. 4B is a side view showing an example in which a triangular guide member is provided.
Figure 4C:
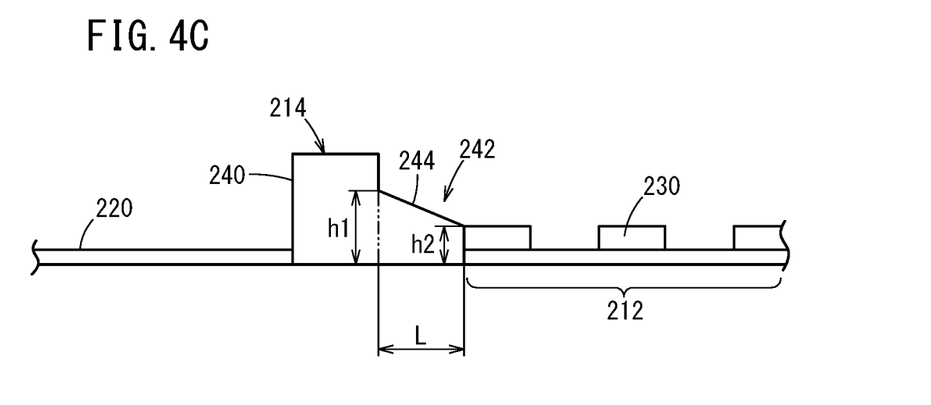
FIG. 4C is a side view showing an example in which a trapezoidal guide member is provided.

As examples of the side surface shape of the guide member 242, as shown in FIGS. 4A to 4C, there may be cited a rectangular shape, a triangular shape, a trapezoidal shape, or the like. Assuming that a length of the guide member 242 in a direction intersecting the one direction, in other words, a length of the guide member 242 (a length between the positioning member 214 and the lead wire retaining member 212) is given by L where the height thereof in closest proximity to the positioning member 214 is given by h1 and the height thereof in closest proximity to the lead wire retaining member 212 is given by h2, the following combinations can be mentioned.

square shape: h1>0, h2>0, L>0, h1=h2=L
rectangular shape (a): h1>0, h2>0, L>0, h1=h2>L
rectangular shape (b): h1>0, h2>0, L>0, h1=h2 <L
triangular shape: h1>0, h2=0, L>0
trapezoidal shape: h1>0, h2>0, h1>h2, L>0

FIG. 4A shows a representative diagram of the rectangular shape (b), FIG. 4B shows a representative diagram of the triangular shape, and FIG. 4C shows a representative diagram of the trapezoidal shape. Further, for the sake of convenience, a boundary portion between the positioning member 214 and the guide member 242 is indicated by the two-dot dashed line.

It goes without saying that these structures are simply offered as examples, and various alternative shapes may be considered. For example, in FIGS. 4A to 4C, although an example is shown in which the boundary between the positioning member 214 and the guide member 242 is linear, such a boundary may also be curved. Further, in the aforementioned example, the thickness of the guide member 242 may be the same as or thicker than the thickness of the positioning member 214. Of course, the thickness thereof may also be thinner, as long as no problem arises in relation to strength.

In the manner described above, by providing the guide member 242, which is formed integrally with the positioning member 214, at the site between the positioning member 214 and the lead wire retaining member 212, the following advantageous effects are realized. More specifically, it is possible to prevent damage from occurring to the metal terminal 18, even when repetitive loads such as tension, compression, bending, and shearing or the like are applied between the positioning member 214 and the lead wire retaining member 212 of the metal terminal 18, or when put to use under a usage environment in which vibrations are intense, and the commercial value of the gas sensor 10 can be increased.

Exemplary Embodiments

Herein, in relation to Exemplary Embodiments 1 to 24 and Comparative Example 1, experimental examples will be presented in which the presence or absence of a conduction failure (contact failure) is confirmed after being subjected to a heating and vibration test. Further, the experimental results are shown in Table 1 and Table 2.

Exemplary Embodiment 1

The metal terminal 18 according to Exemplary Embodiment 1 includes the guide member 242 between the positioning member 214 and the lead wire retaining member 212. In addition, the shape of the guide member 242 (indicated in Tables 1 and 2 as a "guide shape") is a square shape (indicated by the word "square" in Tables 1 and 2).

Among the plurality of surfaces that constitute the guide member 242, the area of the surface thereof along the surface of the positioning member 214 having the largest area (hereinafter, referred to as a "guide area") is 0.01 mm$^2$.

The height of the guide member 242 in closest proximity to the positioning member 214 (hereinafter, referred to as a "guide height h1") is 0.10 mm. Further, the height of the guide member 242 in closest proximity to the lead wire retaining member 212 (hereinafter, referred to as a "guide height h2") is 0.10 mm. The length of the guide member 242 (hereinafter, referred to as a "guide length L") is 0.10 mm.

Exemplary Embodiment 2

The metal terminal 18 according to Exemplary Embodiment 2 also includes the guide member 242, and the shape of the guide member 242 is a triangular shape (indicated by the word "triangular" in Tables 1 and 2). The guide area is 0.01 mm$^2$, the guide height h1 is 0.20 mm, the guide height h2 is 0.00 mm, and the guide length L is 0.10 mm.

Exemplary Embodiment 3

The metal terminal 18 according to Exemplary Embodiment 3 also includes the guide member 242, and the shape of the guide member 242 is a trapezoidal shape (indicated by the word "trapezoidal" in Tables 1 and 2). The guide area is 0.01 mm$^2$, the guide height h1 is 0.07 mm, the guide height h2 is 0.03 mm, and the guide length L is 0.10 mm.

Exemplary Embodiment 4

The metal terminal 18 according to Exemplary Embodiment 4 also includes the guide member 242, and the shape of the guide member 242 is a rectangular shape (indicated by the word "rectangular" in Tables 1 and 2). The guide area is 7.50 mm$^2$, the guide height h1 is 3.00 mm, the guide height h2 is 3.00 mm, and the guide length L is 2.50 mm.

Exemplary Embodiment 5

The metal terminal 18 according to Exemplary Embodiment 5 also includes the guide member 242, and the shape of the guide member 242 is a trapezoidal shape. The guide area is 7.50 mm$^2$, the guide height h1 is 4.00 mm, the guide height h2 is 2.00 mm, and the guide length L is 2.50 mm.

Exemplary Embodiment 6

The metal terminal 18 according to Exemplary Embodiment 6 also includes the guide member 242, and the shape of the guide member 242 is a rectangular shape. The guide area is 1.50 mm$^2$, the guide height h1 is 1.00 mm, the guide height h2 is 1.00 mm, and the guide length L is 1.50 mm.

Exemplary Embodiment 7

The metal terminal 18 according to Exemplary Embodiment 7 also includes the guide member 242, and the shape of the guide member 242 is a rectangular shape. The guide area is 0.80 mm$^2$, the guide height h1 is 0.80 mm, the guide height h2 is 0.80 mm, and the guide length L is 1.00 mm.

Exemplary Embodiment 8

The metal terminal 18 according to Exemplary Embodiment 8 also includes the guide member 242, and the shape of the guide member 242 is a triangular shape. The guide area is 0.80 mm$^2$, the guide height h1 is 1.60 mm, the guide height h2 is 0.00 mm, and the guide length L is 1.00 mm.

Exemplary Embodiment 9

The metal terminal 18 according to Exemplary Embodiment 9 also includes the guide member 242, and the shape of the guide member 242 is a trapezoidal shape. The guide area is 0.80 mm$^2$, the guide height h1 is 1.00 mm, the guide height h2 is 0.60 mm, and the guide length L is 1.00 mm.

Exemplary Embodiment 10

The metal terminal 18 according to Exemplary Embodiment 10 also includes the guide member 242, and the shape of the guide member 242 is a rectangular shape. The guide area is 0.38 mm$^2$, the guide height h1 is 0.46 mm, the guide height h2 is 0.46 mm, and the guide length L is 0.82 mm.

Exemplary Embodiment 11

The metal terminal 18 according to Exemplary Embodiment 11 also includes the guide member 242, and the shape of the guide member 242 is a triangular shape. The guide area is 0.41 mm$^2$, the guide height h1 is 1.00 mm, the guide height h2 is 0.00 mm, and the guide length L is 0.82 mm.

Exemplary Embodiment 12

The metal terminal 18 according to Exemplary Embodiment 12 also includes the guide member 242, and the shape of the guide member 242 is a trapezoidal shape. The guide area is 0.37 mm$^2$, the guide height h1 is 0.60 mm, the guide height h2 is 0.30 mm, and the guide length L is 0.82 mm.

Exemplary Embodiment 13

The metal terminal 18 according to Exemplary Embodiment 13 also includes the guide member 242, and the shape of the guide member 242 is a rectangular shape. The guide area is 0.18 mm$^2$, the guide height h1 is 0.30 mm, the guide height h2 is 0.30 mm, and the guide length L is 0.61 mm.

Exemplary Embodiment 14

The metal terminal 18 according to Exemplary Embodiment 14 also includes the guide member 242, and the shape of the guide member 242 is a triangular shape. The guide area is 0.18 mm$^2$, the guide height h1 is 0.60 mm, the guide height h2 is 0.00 mm, and the guide length L is 0.61 mm.

Exemplary Embodiment 15

The metal terminal 18 according to Exemplary Embodiment 15 also includes the guide member 242, and the shape of the guide member 242 is a trapezoidal shape. The guide area is 0.18 mm$^2$, the guide height h1 is 0.40 mm, the guide height h2 is 0.20 mm, and the guide length L is 0.61 mm.

Exemplary Embodiment 16

The metal terminal 18 according to Exemplary Embodiment 16 also includes the guide member 242, and the shape of the guide member 242 is a rectangular shape. The guide area is 0.11 mm$^2$, the guide height h1 is 0.22 mm, the guide height h2 is 0.22 mm, and the guide length L is 0.49 mm.

Exemplary Embodiment 17

The metal terminal 18 according to Exemplary Embodiment 17 also includes the guide member 242, and the shape of the guide member 242 is a triangular shape. The guide area is 0.10 mm$^2$, the guide height h1 is 0.40 mm, the guide height h2 is 0.00 mm, and the guide length L is 0.49 mm.

Exemplary Embodiment 18

The metal terminal 18 according to Exemplary Embodiment 18 also includes the guide member 242, and the shape of the guide member 242 is a trapezoidal shape. The guide area is 0.10 mm$^2$, the guide height h1 is 0.30 mm, the guide height h2 is 0.10 mm, and the guide length L is 0.49 mm.

Exemplary Embodiment 19

The metal terminal 18 according to Exemplary Embodiment 19 also includes the guide member 242, and the shape of the guide member 242 is a rectangular shape. The guide area is 0.05 mm$^2$, the guide height h1 is 0.15 mm, the guide height h2 is 0.15 mm, and the guide length L is 0.30 mm.

Exemplary Embodiment 20

The metal terminal 18 according to Exemplary Embodiment 20 also includes the guide member 242, and the shape of the guide member 242 is a triangular shape. The guide area is 0.05 mm$^2$, the guide height h1 is 0.30 mm, the guide height h2 is 0.00 mm, and the guide length L is 0.30 mm.

Exemplary Embodiment 21

The metal terminal 18 according to Exemplary Embodiment 21 also includes the guide member 242, and the shape of the guide member 242 is a trapezoidal shape. The guide area is 0.05 mm$^2$, the guide height h1 is 0.20 mm, the guide height h2 is 0.10 mm, and the guide length L is 0.30 mm.

Exemplary Embodiment 22

The metal terminal 18 according to Exemplary Embodiment 22 also includes the guide member 242, and the shape of the guide member 242 is a rectangular shape. The guide area is 0.08 mm$^2$, the guide height h1 is 0.13 mm, the guide height h2 is 0.13 mm, and the guide length L is 0.60 mm.

Exemplary Embodiment 23

The metal terminal 18 according to Exemplary Embodiment 23 also includes the guide member 242, and the shape of the guide member 242 is a triangular shape. The guide area is 0.08 mm$^2$, the guide height h1 is 0.25 mm, the guide height h2 is 0.00 mm, and the guide length L is 0.60 mm.

Exemplary Embodiment 24

The metal terminal 18 according to Exemplary Embodiment 24 also includes the guide member 242, and the shape of the guide member 242 is a trapezoidal shape. The guide area is 0.09 mm$^2$, the guide height h1 is 0.20 mm, the guide height h2 is 0.10 mm, and the guide length L is 0.60 mm.

Comparative Example 1

In the metal terminal 18 according to Comparative Example 1, the guide member 242 is not provided.

[Evaluation Method]

Confirmations were made concerning the presence or absence of a conduction failure (contact failure) after being subjected to a heating and vibration test.

[Experimental Method]

A gas sensor was attached to a chamber through which a high-temperature gas at 850° C. flows, and a test was carried out for 500 hours under the following vibratory conditions.

number of cycles: 50, 100, 150, and 250 Hz
  acceleration: 30 G, 40 G, and 50 G
  sweep time: 30 min/sweep cycle
  testing time period: 500 hours
  gas temperature: 850° C.

During testing, a sensor signal (the pump current Ip2) was monitored, and it was investigated whether or not the sensor signal changed in excess of a predetermined threshold value. When the sensor signal exceeds the predetermined threshold value, it implies that a conduction failure is occurring.

The judgment criteria are as follows:
  A: The sensor signal did not exceed the predetermined threshold value during a durability test.
  B: The sensor signal was in excess of the predetermined threshold value during a period from 50 to 500 hours.
  C: The sensor signal was in excess of the predetermined threshold value during a period of less than or equal to 50 hours.

Figure 5:
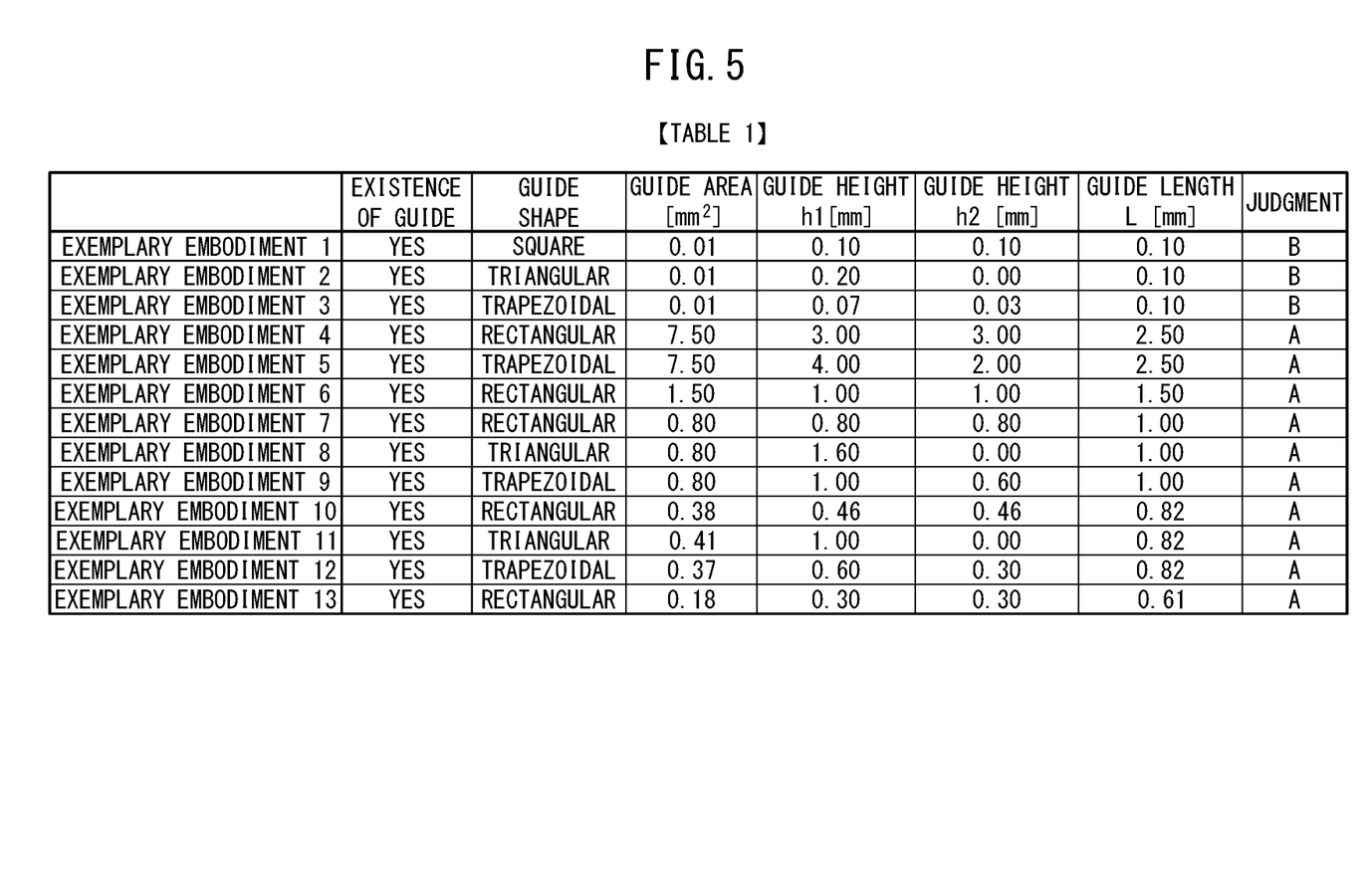
FIG. 5 is a first table (Table 1) in which there are shown evaluation results of experimental examples in which a conduction failure (contact failure) was confirmed in relation to Exemplary Embodiments 1 to 13.
Figure 6:
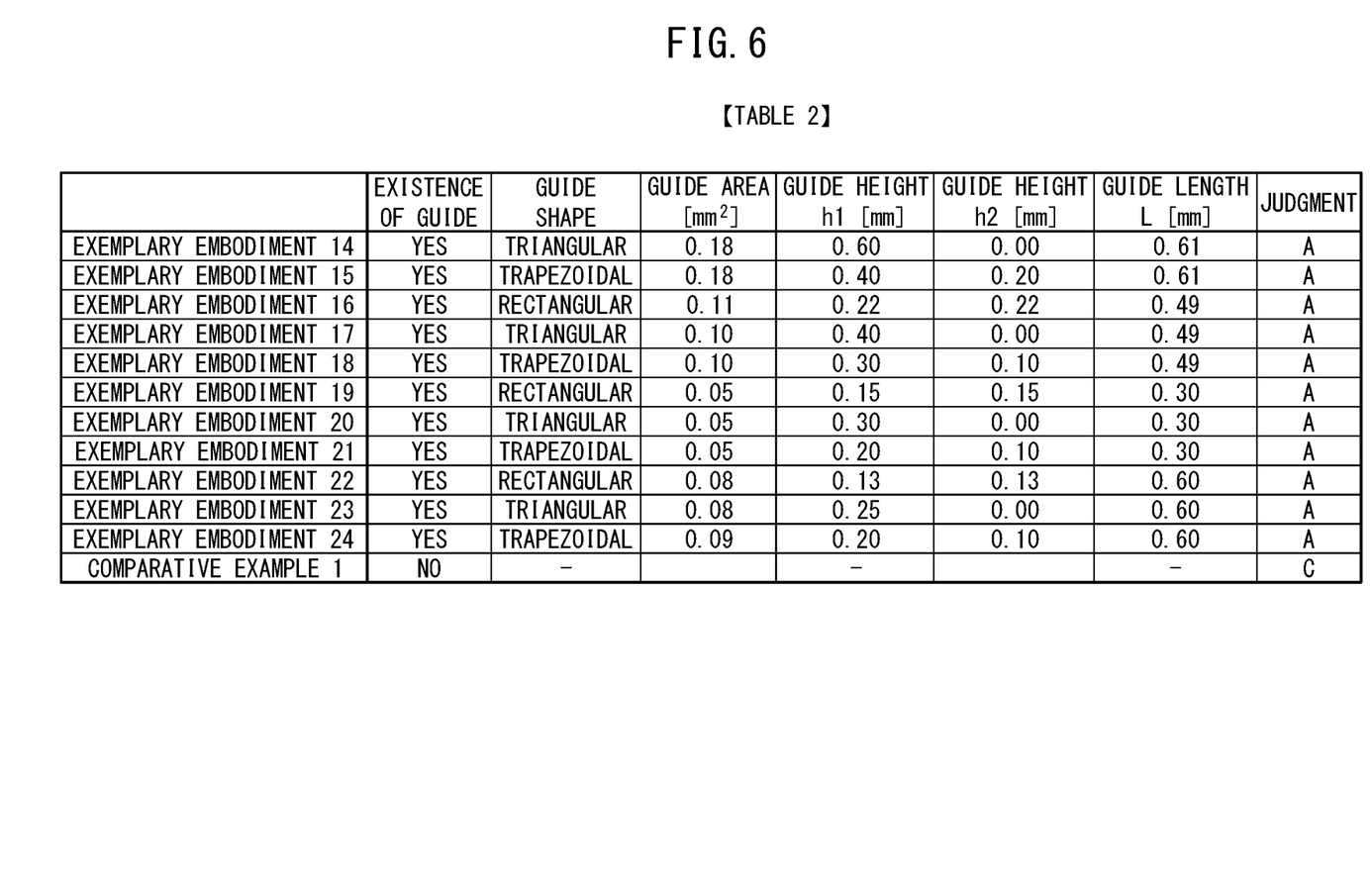
FIG. 6 is a second table (Table 2) in which there are shown evaluation results of experimental examples in which a conduction failure (contact failure) was confirmed in relation to Exemplary Embodiments 14 to 24 and Comparative Example 1.

The evaluation results of Exemplary Embodiments 1 to 13 are shown in Table 1 of FIG. 5, and the evaluation results of Exemplary Embodiments 14 to 24 and Comparative Example 1 are shown in Table 2 of FIG. 6. From the evaluation results shown in Table 1 and Table 2, it can be understood that favorable determination results are obtained by providing the guide member 242, which is formed integrally with the positioning member 214, at the site between the positioning member 214 and the lead wire retaining member 212 of the metal terminal 18.

In particular, the area of the guide member 242 preferably lies within a range of being greater than or equal to 0.01 mm$^2$ and less than or equal to 7.50 mm$^2$, and more preferably, lies within a range of being greater than or equal to 0.05 mm$^2$ and less than or equal to 7.50 mm$^2$. The height h1 of the guide member 242 preferably lies within a range of being greater than or equal to 0.07 mm and less than or equal to 4.00 mm, and more preferably, lies within a range of being greater than or equal to 0.13 mm and less than or equal to 4.00 mm. The height h2 of the guide member 242 preferably lies within a range of being greater than or equal to 0.00 mm and less than or equal to 3.00 mm. The length L of the guide member 242 preferably lies within a range of being greater than or equal to 0.10 mm and less than or equal to 2.50 mm, and more preferably, lies within a range of being greater than or equal to 0.30 mm and less than or equal to 2.50 mm.

Further, the ratio (h0/h1) of a height h0 of the positioning member 214 (see FIG. 4A) to the maximum height (h1) of the guide member 242 preferably lies within a range of being greater than or equal to 1.33 and less than or equal to 30.00. The ratio (L0/L) of a length L0 of the positioning member 214 (see FIG. 4A) to the length L of the guide member 242 preferably lies within a range of being greater than or equal to 1.2 and less than or equal to 20.00.

Inventions Obtained from the Present Embodiment

A description will be given below concerning the inventions that can be grasped from the above-described embodiment.

[1] The metal terminal (18) according to the present embodiment is installed in the gas sensor (10) including the sensor element (12) and the ceramic housing (16) configured to retain the rear end portion of the sensor element (12), and electrically connects the sensor element (12) and the lead wires (54), the metal terminal (18) comprising the element contacting portion (210) disposed at one end of the metal terminal (18), and configured to be placed in contact with the sensor element (12), the lead wire retaining member (212) disposed at the other end of the metal terminal (18), and configured to crimp and retain the lead wires (54), the positioning member (214) disposed between the one end and the other end and extending in a direction intersecting the one direction, the positioning member (214) being configured to position the metal terminal (18) on the ceramic housing (16), and the guide member (242) provided integrally with the positioning member (214) at a site between the positioning member (214) and the lead wire retaining member (212).

In accordance with such features, it is possible to prevent damage from occurring to the metal terminal 18, even when repetitive loads such as tension, compression, bending, and shearing or the like are applied between the positioning member 214 and the lead wire retaining member 212 of the metal terminal 18, or when put to use under a usage environment in which vibrations are intense, and the commercial value of the gas sensor 10 can be increased.

[2] In the present embodiment, among the plurality of surfaces constituting the guide member (242), the area of the surface thereof along a surface of the positioning member (214) having a largest area preferably lies within a range of being greater than or equal to 0.01 mm² and less than or equal to 7.50 mm².

[3] In the present embodiment, among the plurality of surfaces constituting the guide member (242), the area of the surface thereof along a surface of the positioning member (214) having a largest area preferably lies within a range of being greater than or equal to 0.05 mm² and less than or equal to 7.50 mm².

[4] In the present embodiment, the height (h1) of the guide member (242) preferably lies within a range of being greater than or equal to 0.07 mm and less than or equal to 4.00 mm in closest proximity to the positioning member (214).

[5] In the present embodiment, the height (h1) of the guide member (242) preferably lies within a range of being greater than or equal to 0.13 mm and less than or equal to 4.00 mm in closest proximity to the positioning member (214).

[6] In the present embodiment, the height (h2) of the guide member (242) preferably lies within a range of being greater than or equal to 0.00 mm and less than or equal to 3.00 mm in closest proximity to the lead wire retaining member (212).

[7] In the present embodiment, the length (L) of the guide member (242) along the one direction preferably lies within a range of being greater than or equal to 0.10 mm and less than or equal to 2.50 mm.

[8] In the present embodiment, the length (L) of the guide member (242) along the one direction preferably lies within a range of being greater than or equal to 0.30 mm and less than or equal to 2.50 mm.

[9] In the present embodiment, the ratio (h0/h1) of the height (h0) of the positioning member (214) to the maximum height (h1) of the guide member (242) preferably lies within a range of being greater than or equal to 1.33 and less than or equal to 30.00.

[10] In the present embodiment, the ratio (L0/L) of the length (L0) of the positioning member (214) (see FIG. 4A) to the length (L) of the guide member (242) preferably lies within a range of being greater than or equal to 1.2 and less than or equal to 20.00.

In the above-described embodiments, the sensor element 12 detects the NOx concentration within the gas to be measured. However, the present invention is not limited to this feature, so long as the sensor element 12 detects the concentration of a specific gas existing within the gas to be measured. For example, the sensor element 12 may detect the oxygen concentration within the gas to be measured.

In practicing the present invention, various configurations for improving reliability may be added as components for an automotive vehicle to such an extent that the concept of the present invention is not impaired.

What is claimed is:

1. A metal terminal, which is installed in a gas sensor including a sensor element, and a ceramic housing configured to retain a rear end portion of the sensor element, the metal terminal being configured to electrically connect the sensor element and a lead wire, and comprising:

an element contacting portion disposed at one end of the metal terminal, and configured to be placed in contact with the sensor element;

a lead wire retaining member disposed at another end of the metal terminal, and configured to crimp and retain the lead wire;

a positioning member disposed between the one end and the another end, and extending in a direction intersecting one direction, the positioning member being configured to position the metal terminal on the ceramic housing;

a guide member provided integrally with the positioning member at a site between the positioning member and the lead wire retaining member; and an elongated extending portion extending in the one direction from the one end to the another end of the metal terminal, wherein a rear end surface of the guide member is in contact with a front surface of the lead wire retaining member, the positioning member and the guide member are bent from the elongated extending portion to one side, and the element contacting portion is bent from the elongated extending portion to another side that is opposite to the one side.

2. The metal terminal according to claim 1, wherein among a plurality of surfaces constituting the guide member, an area of a surface thereof along a surface of the positioning member having a largest area lies within a range of being greater than or equal to 0.01 mm² and less than or equal to 7.50 mm².

3. The metal terminal according to claim 1, wherein among a plurality of surfaces constituting the guide member, an area of a surface thereof along a surface of the positioning member having a largest area lies within a range of being greater than or equal to 0.05 mm² and less than or equal to 7.50 mm².

4. The metal terminal according to claim 1, wherein a height of the guide member lies within a range of being greater than or equal to 0.07 mm and less than or equal to 4.00 mm in closest proximity to the positioning member.

5. The metal terminal according to claim 1, wherein a height of the guide member lies within a range of being greater than or equal to 0.13 mm and less than or equal to 4.00 mm in closest proximity to the positioning member.

6. The metal terminal according to claim 1, wherein a height of the guide member lies within a range of being greater than or equal to 0.00 mm and less than or equal to 3.00 mm in closest proximity to the lead wire retaining member.

7. The metal terminal according to claim 1, wherein a length of the guide member along the one direction lies within a range of being greater than or equal to 0.10 mm and less than or equal to 2.50 mm.

8. The metal terminal according to claim 1, wherein a length of the guide member along the one direction lies within a range of being greater than or equal to 0.30 mm and less than or equal to 2.50 mm.

9. The metal terminal according to claim 1, wherein a ratio of a height of the positioning member to a maximum height of the guide member lies within a range of being greater than or equal to 1.33 and less than or equal to 30.00.

10. The metal terminal according to claim 1, wherein a ratio of a length of the positioning member to a length of the guide member lies within a range of being greater than or equal to 1.2 and less than or equal to 20.00.

* * * * *